No. 858,385. PATENTED JULY 2, 1907.
E. HAEFELY.
METHOD OF MAKING INSULATING TUBES.
APPLICATION FILED MAY 2, 1906.
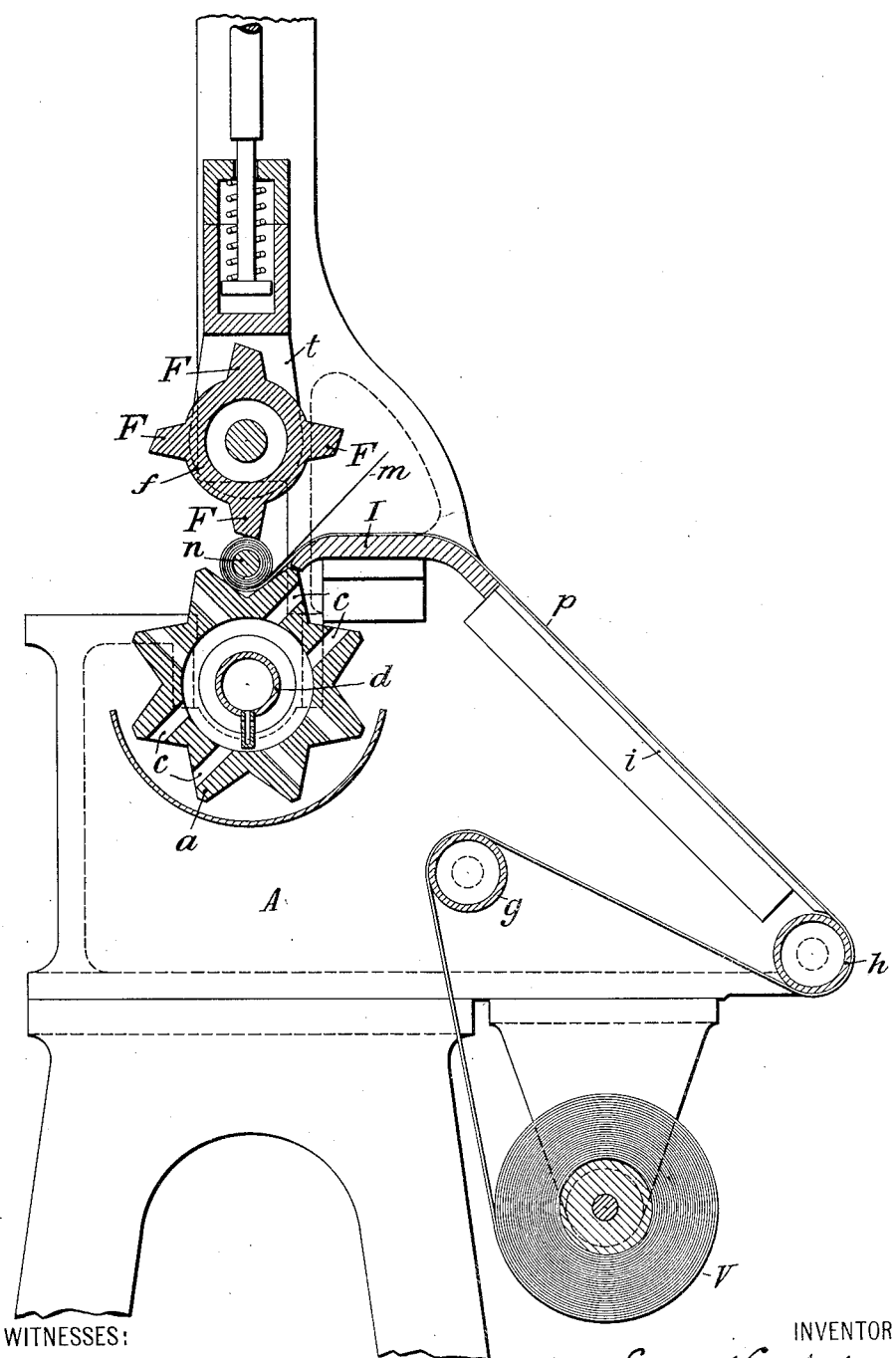
WITNESSES:
C. L. Belcher
R. P. Dearborn
INVENTOR
Emil Haefely
BY
Wesley L. Carr
ATTORNEY

UNITED STATES PATENT OFFICE.

EMIL HAEFELY, OF BASEL, SWITZERLAND, ASSIGNOR TO WESTINGHOUSE ELECTRIC & MANUFACTURING COMPANY, A CORPORATION OF PENNSYLVANIA.

METHOD OF MAKING INSULATING-TUBES.

No. 858,385.            Specification of Letters Patent.            Patented July 2, 1907.

Original application filed September 26, 1904, Serial No. 223,442. Divided and this application filed May 2, 1906. Serial No. 314,909.

*To all whom it may concern:*

Be it known that I, EMIL HAEFELY, a citizen of the Republic of Switzerland, and a resident of Basel, in Switzerland, have invented a new and useful Improvement in Methods of Making Insulating-Tubes, of which the following is a specification, this application being a division of my application, Serial No. 223,442, filed September 26, 1904.

My invention relates to methods of manufacturing insulating tubes, and it has for its object to provide a method which may be conveniently and uniformly practiced to insure the production of tubes of invariable composition and excellence and of great hardness and density.
The article of manufacture and the method of producing it are not dependent upon the use of specific mechanism except in the sense and to the extent that the application of constant and substantially uniform pressure and of heat must be so made as to insure a uniform product having certain qualities and characteristics which will be hereinafter more particularly pointed out, yet I have devised mechanism which I have found admirably adapted to the practicing of my method and have set forth and claimed the same in the application of which this is a division, a portion of the mechanism being illustrated in the single figure of the accompanying drawing, in order to enable me to set forth, with more accuracy and with better facility, the characteristic features of the method.
Tubes constructed in accordance with my invention comprise a plurality of concentric layers of insulating fabric, varnish or other similar binding material and sheet mica, or, in some cases and for some purposes, the tubes may be formed of paper and varnish only. The material which I herein designate as varnish may be any suitable gummy impregnating and binding material which may be melted by heat to drive off all volatile constituents as the fibrous sheet, to which it has been applied, passes to the prior convolution upon the mandrel.

In order to produce a tube of the desired character, a cylindrical metal core is employed the diameter of which corresponds to the internal diameter of the tube to be produced, and the paper, coated uniformly upon one side with varnish, and with or without sheets of mica placed upon the coated side, is wound, under suitable tension, around the metal core, and during such winding operation, uniform pressure is applied, preferably along three lines throughout the length of the tube and of such degree as to not only force the consecutive layers of material into such intimate contact as to provide a resulting product of substantially uniform composition, but so as to also expel all surplus varnish. During the winding operation, a considerable degree of heat is also applied to one or more of the surfaces between which the material is compressed and also, preferably, to the material just before it reaches such surfaces, in order to melt the varnish and expel all air and volatile constituents therefrom and thus insure a uniform product having no impurities or defects, and, therefore, one which will resist, at all points, the maximum difference of potential which may be resisted at any one point in the tube.

A roll V of paper or other insulating fabric is supported in suitable bearings on a machine frame A and the paper $p$ is drawn therefrom over a tension roll $g$, around a guide roll $h$, and over an inclined table $i$, where a coat of varnish may be applied. The coated paper from the table $i$ over a metal portion I of the frame to a mandrel or core $n$, around which it is wound by rotating the mandrel or core by machinery or by hand, the sheets of mica $m$, if such are employed, being introduced preferably as the coated sheet of paper passes to the mandrel.

The mandrel is supported by a mandrel holder $a$, here shown as provided with a plurality of longitudinal recesses of angular or V-shape in cross section, the holder being hollow and containing in its interior a gas pipe $d$ having small outlets for the gas to be burned for the purpose of heating the holder and also the portion I of the frame.

The air for supporting combustion may enter the holder and the products of combustion may pass out from it by means of passages $c$, the passages at the lower side of the holder serving for the first named purpose and those at the upper side for the purpose last named.

The constant and substantially uniform pressure which it is necessary to exert upon the material as the tube is in process of formation is provided by means of a pressure device comprising a horizontal bar $t$ and a pressure roller $f$ having flanges or ribs F each of which has a beveled outer edge and one of which rests upon the upper side of the roll as it is formed by the rotation of the mandrel. Since the pressure device is loosely supported upon the roll and the recess in the mandrel holder is of angular shape in cross section, the pressure is uniformly applied along three lines which are approximately 120° apart and neither the degree of pressure nor the lines along which it is applied vary materially as the diameter of the tube increases.

As I have already stated, any excess of varnish over that which is required to bind the layers of paper or the layers of paper and mica into intimate contact and to fill all interstices in the material will be expelled adjacent to the inner edge of the frame portion I and may be removed at intervals, by any suitable means, as the same accumulates. I desire to also state again that the form and relative location of the parts for the purpose of securing the desired pressure and the application of heat to the material may be reversed and otherwise modified as to form, dimensions and relative arrangement, without materially affecting my present invention, so long as the application of heat and pressure is such as to insure the production of tubes having the qualities and characteristics which pertain to those manufactured by the use of the mechanism here illustrated and by the method described.

I claim as my invention:

1. The method of making an insulating tube which consists in winding a varnish-coated fabric upon a mandrel to form a plurality of layers and applying heat to the uncoated surface of the fabric as it approaches the mandrel and substantially uniform pressure and heat to the outer surface of the tube during the winding operation.

2. The method of making an insulating tube which consists in winding a varnish-coated sheet of fibrous material upon a mandrel and simultaneously applying heat to the material as it approaches the mandrel, and both heat and substantially uniform pressure to the tube during the winding operation.

3. The method of making an insulating tube which consists in winding a plurality of insulating sheets and interposed gummy material upon a mandrel and applying heat externally to the outer sheet as it passes to the mandrel and heat and a substantially uniform, continuous pressure to the outer surface of the tube as it is formed.

4. The method of making an insulating tube which consists in winding a sheet of varnish-coated fibrous material and a superposed layer of mica upon a mandrel and simultaneously pressing the tube against a plurality of heated surfaces with continuous and substantially uniform force during the winding operation.

5. The method of making an insulating tube which consists in winding a varnish-coated fabric upon a mandrel to form a plurality of convolutions and simultaneously pressing the successive outer convolutions against a plurality of heated surfaces with substantially uniform continuous force.

In testimony whereof, I have hereunto subscribed my name this 30th day of April, 1906.

EMIL HAEFELY.

Witnesses:
WESLEY G. CARR,
BIRNEY HINES.